US012664062B2

(12) United States Patent
Shiozawa et al.

(10) Patent No.: US 12,664,062 B2
(45) Date of Patent: Jun. 23, 2026

(54) VEHICLE-MOUNTED INFORMATION PROCESSING APPARATUS AND VEHICLE-MOUNTED INFORMATION PROCESSING METHOD FOR CONVERTING BETWEEN A VIRTUAL AND PHYSICAL ADDRESS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takayuki Shiozawa, Yokkaichi (JP); Norihiro Ono, Yokkaichi (JP); Shigeto Akahori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 408 days.

(21) Appl. No.: 18/253,965

(22) PCT Filed: Nov. 11, 2021

(86) PCT No.: PCT/JP2021/041447
§ 371 (c)(1),
(2) Date: May 23, 2023

(87) PCT Pub. No.: WO2022/113747
PCT Pub. Date: Jun. 2, 2022

(65) Prior Publication Data
US 2024/0046720 A1      Feb. 8, 2024

(30) Foreign Application Priority Data
Nov. 24, 2020    (JP) ................................. 2020-194514
Jun. 3, 2021    (JP) ................................. 2021-093646

(51) Int. Cl.
*G06F 11/20* (2006.01)
*B60R 16/023* (2006.01)
(Continued)

(52) U.S. Cl.
CPC .......... *G06F 11/20* (2013.01); *B60R 16/0232* (2013.01); *G06F 9/3834* (2013.01);
(Continued)

(58) Field of Classification Search
CPC .... G06F 9/3834; G06F 9/3861; G06F 9/3863; G06F 9/544; G06F 11/1666; G06F 11/20;
(Continued)

(56) References Cited

U.S. PATENT DOCUMENTS 5,890,218 A      3/1999  Ogawa et al.
2003/0140271 A1*  7/2003  Wynn ................. G06F 11/1666
714/6.13
(Continued)

FOREIGN PATENT DOCUMENTS

JP        H9-034854      2/1997
JP        2000-148523 A      5/2000
(Continued)

OTHER PUBLICATIONS

English translation of JP-2000284983-A retrieved from Espacenet on Jun. 6, 2025, 21 pages.*
(Continued)

*Primary Examiner* — Jennifer N Welch
(74) *Attorney, Agent, or Firm* — Brooks Kushman P.C.

(57) ABSTRACT

A vehicle-mounted information processing apparatus is mounted in a vehicle and includes: a plurality of processing units configured to execute processing in parallel; and a plurality of shared storage units that are accessible by the plurality of processing units, wherein the plurality of processing units exchange information via at least one of the
(Continued)

shared storage units and change the at least one of the shared storage units used to exchange information, at predetermined timing. A detection unit configured to detect an abnormality for the shared storage units is also provided. The predetermined timing is the timing at which the detection unit has detected an abnormality occurred at the at least one of the shared storage units. When the detection unit has detected an abnormality occurred at the at least one of the shared storage units, the plurality of processing units may exchange information via a different shared storage unit.

8 Claims, 10 Drawing Sheets

(51) Int. Cl.

| | |
|---|---|
| *G06F 9/38* | (2018.01) |
| *G06F 9/54* | (2006.01) |
| *G06F 11/16* | (2006.01) |
| *G06F 15/167* | (2006.01) |
| *G06F 21/78* | (2013.01) |

(52) U.S. Cl.
CPC .......... *G06F 9/3861* (2013.01); *G06F 9/3863* (2013.01); *G06F 9/544* (2013.01); *G06F 11/1666* (2013.01); *G06F 15/167* (2013.01); *G06F 21/78* (2013.01); *G06F 2201/86* (2013.01)

(58) Field of Classification Search
CPC .... G06F 2201/86; G06F 15/167; G06F 21/78; B60R 16/0232
See application file for complete search history.

(56) References Cited

U.S. PATENT DOCUMENTS

| | | | | |
|---|---|---|---|---|
| 2007/0067668 A1* | 3/2007 | Yuzawa | .............. | G06F 11/1415 714/E11.132 |
| 2012/0124415 A1* | 5/2012 | Borkenhagen | ...... | G06F 11/1666 714/E11.089 |
| 2014/0189422 A1* | 7/2014 | Niwa | .................. | G06F 11/0793 714/6.23 |
| 2014/0281694 A1* | 9/2014 | Gotsubo | ................. | G06F 11/30 714/6.32 |
| 2015/0039865 A1* | 2/2015 | Ishigooka | ............. | G06F 9/3001 712/221 |
| 2015/0261473 A1* | 9/2015 | Matsuyama | .......... | G06F 3/0659 711/103 |
| 2015/0363286 A1* | 12/2015 | Blea | .................... | G06F 11/2058 714/6.3 |
| 2017/0177246 A1* | 6/2017 | Miller | ................. | G06F 11/1666 |
| 2018/0253390 A1* | 9/2018 | Tsukidate | ............ | G06F 11/2242 |
| 2020/0065203 A1* | 2/2020 | Nguyen | ................ | G06F 3/0619 |

FOREIGN PATENT DOCUMENTS

| | | | |
|---|---|---|---|
| JP | 2000284983 A | * | 10/2000 |
| JP | 2001-166960 A | | 6/2001 |
| JP | 2018-013843 A | | 1/2018 |

OTHER PUBLICATIONS

International Search Report, Application No. PCT/JP2021/041447, mailed Jan. 18, 2022. ISA/Japan Patent Office.

\* cited by examiner

VEHICLE-MOUNTED INFORMATION PROCESSING APPARATUS AND VEHICLE-MOUNTED INFORMATION PROCESSING METHOD FOR CONVERTING BETWEEN A VIRTUAL AND PHYSICAL ADDRESS

CROSS-REFERENCE TO RELATED APPLICATIONS

This application is the U.S. national stage of PCT/JP2021/041447 filed on Nov. 11, 2021, which claims priority of Japanese Patent Application Nos. JP 2020-194514 filed on Nov. 24, 2020, and JP 2021-093646 filed on Jun. 3, 2021, the contents of which are incorporated herein.

TECHNICAL FIELD

The present disclosure relates to a vehicle-mounted information processing apparatus and vehicle-mounted information processing method where information is exchanged between a plurality of processing units.

BACKGROUND

JP 2018-13843A describes a multicore computing apparatus that is equipped with a first core, a second core, and a shared memory and has the two cores communicate via the shared memory. In this multicore computing apparatus, the first core executes a behavior schedule application, which decides a behavior schedule indicating an order of changes in behavior of a vehicle driving transmission apparatus subjected to control, and the second core executes an actuator control application, which controls an actuator that operates the vehicle driving transmission apparatus, and a sensing application, which acquires and provides physical information.

The multicore computing apparatus described in JP 2018-13843A is configured so that a plurality of cores communicate via the shared memory. In recent years, vehicle-mounted apparatuses such as ECUs (Electronic Control Units) have been provided with increasingly advanced functionality and have sometimes used a multicore plus shared memory configuration.

The present disclosure was conceived in view of the situation described above and has an object of providing a vehicle-mounted information processing apparatus and a vehicle-mounted information processing method which can contribute to the adoption of a multicore plus shared memory configuration in vehicle-mounted apparatuses.

SUMMARY

A vehicle-mounted information processing apparatus according to an aspect of the present disclosure is mounted in a vehicle and includes: a plurality of processing units configured to execute processing in parallel; and a plurality of shared storage units that are accessible by the plurality of processing units, wherein the plurality of processing units exchange information via at least one of the shared storage units, and the at least shared storage units used to exchange information are changed at predetermined timing.

The above aspect of the present disclosure can be realized not only as an apparatus including the characteristic control unit described above, but also as a method that has the characteristic processing in question as steps or as a computer program for causing a computer to execute such steps.

It is also possible to realize part or all of the apparatuses described above as a semiconductor integrated circuit or as another apparatus or system including the above apparatuses.

Advantageous Effects

By using the configuration described above, it is possible to contribute to adoption of a multicore plus shared memory configuration in vehicle-mounted apparatuses.

DETAILED DESCRIPTION OF PREFERRED EMBODIMENTS

Figure 1:
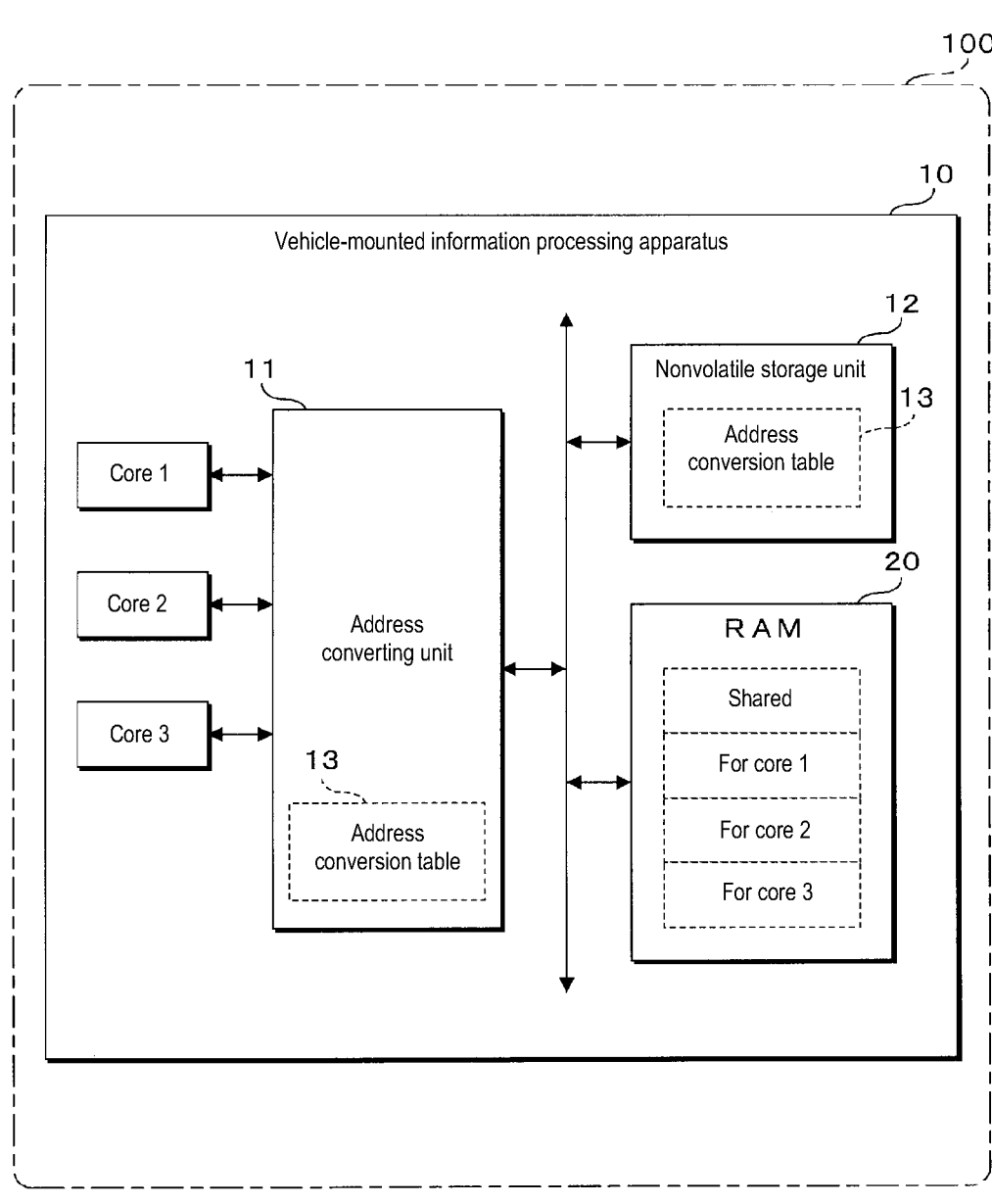
FIG. 1 is a block diagram depicting the configuration of a vehicle-mounted information processing apparatus according to an embodiment.

Several embodiments of the present disclosure will first be listed and described in outline. At least some parts of the embodiments described below may be freely combined.

First Aspect

In accordance with a first aspect, a vehicle-mounted information processing apparatus according to an aspect of the present disclosure is mounted in a vehicle and includes: a plurality of processing units configured to execute processing in parallel; and a plurality of shared storage units that are accessible by the plurality of processing units, wherein the plurality of processing units exchange information via at least one of the shared storage units, and change the at least one shared storage unit used to exchange information, at predetermined timing.

According to this aspect, the vehicle-mounted information processing apparatus includes a plurality of processing units that perform processing in parallel and a plurality of shared storage units that are accessible by the plurality of processing units. The plurality of processing units exchange information via at least one shared storage unit out of the plurality of shared storage units, and change the shared storage unit used to exchange information at predetermined timing. Since the vehicle-mounted information processing apparatus can appropriately use the plurality of shared storage units to perform various processing, as examples, processing that responds to abnormalities or processing that improves security performance, this is likely to contribute to the adoption of a multicore plus shared memory configuration in vehicle-mounted apparatuses.

Second Aspect

In a second aspect, it is preferable to further include a detection unit configured to detect an abnormality at a shared storage unit, for the predetermined timing to be timing at which the detection unit detects an abnormality at the at least one shared storage unit, and when the detection unit has detected an abnormality at the at least one shared storage unit, for the plurality of processing units to exchange information via a different shared storage unit.

According to this aspect, when an abnormality has been detected for the at least one shared storage unit being used to exchange information, the plurality of processing units exchange information via a different shared storage unit out of the plurality of shared storage units. With this configuration, even when an abnormality has occurred for the at least one shared storage unit, it is likely that the plurality of processing units will continue exchanging information via another shared storage unit.

Third Aspect

In a third aspect, it is preferable for the predetermined timing to include at least one of timing at which the apparatus starts up, timing at which an attack from outside has been detected, timing at which a predetermined period has elapsed, timing at which an apparatus housing has been opened, and timing at which a connector connected to the apparatus has been disconnected.

According to this aspect, the predetermined timing at which the shared storage unit used to exchange information is changed includes at least one of timing at which the apparatus starts up, timing at which an attack from outside has been detected, timing at which a predetermined period has elapsed, timing at which an apparatus housing has been opened, and timing at which a connector connected to the apparatus has been disconnected. By changing the shared storage unit at such timing, it is possible when there has been a malicious infiltration, attack, or the like from outside into the apparatus, to make it difficult to identify which shared storage unit is being used by the plurality of processing units, which is likely to make tampering and the like of information in the shared storage units difficult.

Fourth Aspect

In a fourth aspect, it is preferable for the plurality of processing units to change the shared storage unit used to exchange information to a shared storage unit selected at random out of the plurality of shared storage units.

According to this aspect, when the shared storage unit used to exchange information is changed, one or a plurality of shared storage units is/are selected at random out of the plurality of shared storage units as the changed-to shared storage units. As a result, it is likely to make it difficult to specify from outside the shared storage units being used by the plurality of processing units.

Fifth Aspect

In a fifth aspect, it is preferable to further include an address converting unit that is provided between the plurality of processing units and the plurality of shared storage units and that is configured to convert between virtual addresses used by the processing units when accessing stored information and physical addresses in the shared storage units, and for the address converting unit to change a correspondence between the virtual addresses and the physical addresses at the predetermined timing to switch the shared storage unit where the plurality of processing units exchange information.

According to this aspect, an address converting unit is interposed between the plurality of processing units and the plurality of shared storage units and converts between virtual addresses used by the processing units and physical addresses in the shared storage units. By changing the correspondence between the virtual addresses and the physical addresses at the predetermined timing, the vehicle-mounted information processing apparatus switches the shared storage unit where the plurality of processing units exchange information. In this manner, the processing units are capable of accessing information without considering the physical addresses in the shared storage units.

Sixth Aspect

In a sixth aspect, it is preferable to further include a storage unit storing an address conversion table in which the correspondence between the virtual addresses and the physical addresses is stored, for the address converting unit to perform address conversion based on the address conversion table stored in the storage unit, and for the correspondence stored in the address conversion table to be changed at the predetermined timing.

According to this aspect, the address conversion table, in which the correspondence between the virtual addresses and the physical addresses is stored, is stored in the storage unit, and the address converting unit reads the address conversion table from the storage unit and performs address conversion. By changing the correspondence in the address conversion table at the predetermined timing, the vehicle-mounted information processing apparatus changes the address conversion performed by the address converting unit. In this manner, it is easy to change the address conversion performed by the address converting unit.

Seventh Aspect

In a seventh aspect, it is preferable for the address converting unit to acquire the address conversion table stored in the storage unit when the apparatus starts up, and for the apparatus to change, at the predetermined timing, the correspondence stored in the address conversion table stored in the storage unit and to then restart.

According to this aspect, the address converting unit acquires the address conversion table stored in the storage unit when the vehicle-mounted information processing apparatus starts up and performs address conversion according to the content of the acquired address conversion table. The vehicle-mounted information processing apparatus changes the correspondence in the address conversion table at the predetermined timing and then restarts the apparatus. In this way, by restarting the apparatus, the vehicle-mounted information processing apparatus is capable of easily having changes reflected in the address conversion performed by the address converting unit.

Eighth Aspect

In an eighth aspect, it is preferable for the same information to be stored in each of the plurality of shared storage units in response to a write request for information from the processing units.

According to this aspect, the same information is stored in each of a plurality of shared storage units in response to a write request for information from a processing unit. With this configuration, it is possible to back up information in the plurality of shared storage units. Even when the shared storage unit to be used by the plurality of processing units to exchange information has changed in response to an abnormality or the like, since the same information will be stored in the shared storage unit used after the change, it is easy for the plurality of processing units to continue processing.

Ninth Aspect

In a ninth aspect, it is preferable for the plurality of shared storage units to be a plurality of storage areas provided in a single memory element that is accessible by the plurality of processing units.

According to this aspect, the plurality of storage areas provided in a single memory element are used as a plurality of shared storage units. With this configuration, the likely cost of providing the plurality of shared storage units is low.

Tenth Aspect

In a tenth aspect, it is preferable for the plurality of shared storage units to be a plurality of memory elements that are accessible by the plurality of processing units.

According to this aspect, a plurality of memory elements are used as the plurality of shared storage units. With this configuration, in cases where the same information is stored so as to be backed up in a plurality of shared storage units or the like, it is possible to perform writes and the like of information in parallel, which is likely to increase processing speed.

Eleventh Aspect

In an eleventh aspect, a vehicle-mounted information processing apparatus according to another aspect of the present disclosure is mounted in a vehicle and includes: a plurality of processing units configured to execute processing in parallel; a plurality of shared storage units that are accessible by the plurality of processing units; and a detection unit configured to detect an abnormality occurred at any of the shared storage units, wherein the plurality of processing units exchange information via at least one of the shared storage units, and exchange information, when the detection unit has detected an abnormality at the at least one shared storage unit, via a different shared storage unit.

According to this aspect, in the same way as aspect (2) above, even when an abnormality has occurred for the at least one shared storage unit, it is likely that the plurality of processing units will continuously exchange information via a different shared storage unit.

Twelfth Aspect

In a twelfth aspect, a vehicle-mounted information processing method according to an aspect of the present disclosure includes exchanging, in a vehicle-mounted information processing apparatus provided with a plurality of processing units configured to execute processing in parallel and a plurality of shared storage units that are accessible by the plurality of processing units, information between the plurality of processing units via at least one of the shared storage units, and changing the at least one shared storage unit used to exchange information, at predetermined timing.

In the same way as aspect (1) above, this aspect is likely to contribute to the adoption of a multicore plus shared memory configuration in vehicle-mounted apparatuses.

Specific configurations of vehicle-mounted information processing apparatuses according to embodiments of the present disclosure will now be described with reference to the attached drawings. The present disclosure is not limited to the illustrated configurations and is instead indicated by the range of the patent claims and intended to include all changes within the meaning and scope of the patent claims and their equivalents.

First Embodiment

Apparatus Configuration

FIG. 1 is a block diagram depicting the configuration of a vehicle-mounted information processing apparatus according to the present embodiment. A vehicle-mounted information processing apparatus 10 according to the present embodiment may take the form of various apparatuses, such as an electronic control unit (ECU) or a gateway (GW) mounted in a vehicle 100. The vehicle-mounted information processing apparatus 10 is equipped with a plurality of processing units, such as CPUs (Central Processing Units) or MPUs (Micro-Processing Units) that perform various computational processing by executing programs. In the present embodiment, the vehicle-mounted information processing apparatus 10 is assumed to have three processing units, which are referred to as "core 1" to "core 3". The vehicle-mounted information processing apparatus 10 according to the present embodiment includes the cores 1 to 3 mentioned above, an address converting unit 11, a nonvolatile storage unit 12, a RAM (Random Access Memory) 20, and the like. The address converting unit 11 is provided between the cores 1 to 3 and the nonvolatile storage unit 12 and RAM 20 and performs access control to the nonvolatile storage unit 12 and the RAM 20 for the cores 1 to 3. When accessing a memory, such as the RAM 20, to write data and to read data, the cores 1 to 3 specify an address indicating the storage area to be accessed. The cores 1 to 3 handle and process data in individual address spaces, and the address converting unit 11 converts between addresses in such address spaces (that is, virtual addresses) and addresses in the RAM 20 (that is, physical addresses).

The nonvolatile storage unit 12 is configured using a nonvolatile memory element whose data can be rewritten, such as a flash memory or an EEPROM (Electrically Erasable Programmable Read Only Memory). As examples, the nonvolatile storage unit 12 may store in advance programs to be executed by the cores 1 to 3 and data to be used in processing by the cores 1 to 3. In the present embodiment, an address conversion table 13 used in the processing of the address converting unit 11 is stored in advance in the nonvolatile storage unit 12. As one example, the address conversion table 13 is a table that stores correspondence between virtual addresses used by the cores 1 to 3 and physical addresses in the RAM 20.

The RAM 20 is configured using a large-capacity memory element whose data can be rewritten, such as an SRAM (Static Random Access Memory) or a DRAM (Dynamic Random Access Memory). Note that the vehicle-mounted information processing apparatus 10 may include a storage unit that uses a nonvolatile memory element, such as flash memory, in place of the RAM 20. The RAM 20 temporarily stores data generated during the various processing performed by the cores 1 to 3. In the present embodiment, the storage area of the RAM 20 is divided into and used as a plurality of areas.

Figure 2:
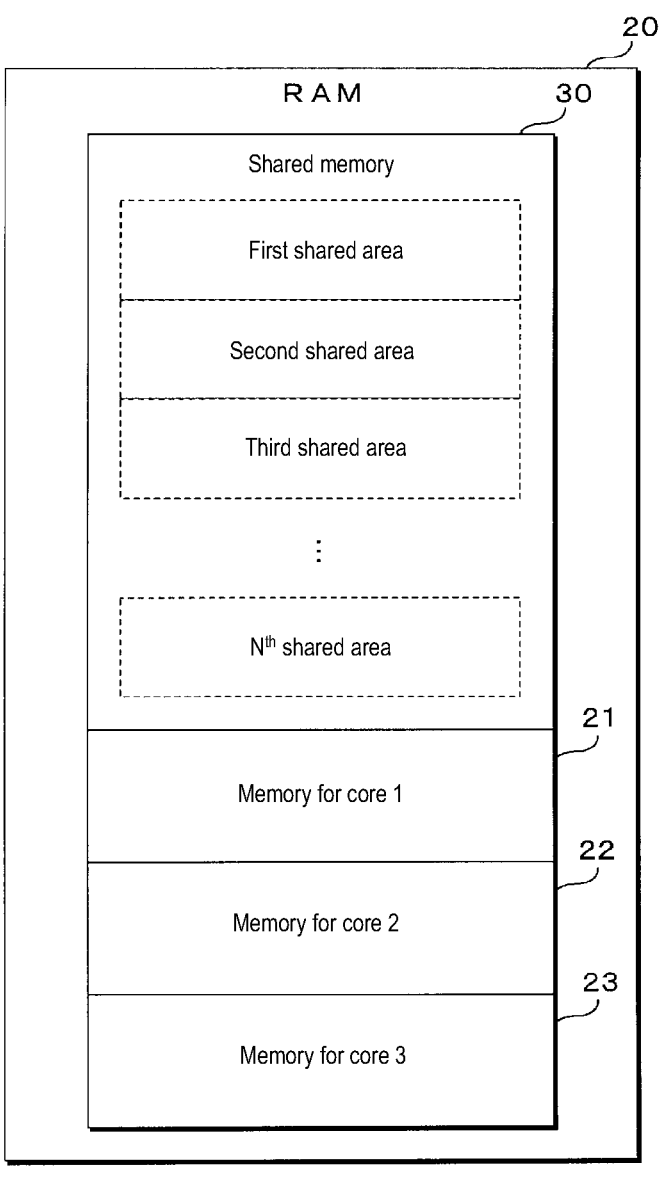
FIG. 2 is a schematic diagram useful in explaining a storage area of a RAM.

FIG. 2 is a schematic diagram useful in explaining the storage area of the RAM 20. The storage area of the RAM 20 of the vehicle-mounted information processing apparatus 10 according to the present embodiment is divided into and used as four main storage areas, a shared memory 30, a core 1 memory 21, a core 2 memory 22, and a core 3 memory 23. The shared memory 30 is also divided into and used as N storage areas (where N=1, 2, 3, . . . ), in the form of a first shared area, a second shared area, a third shared area, . . . , and an Nth storage area.

The core 1 memory 21 of the RAM 20 is a storage area that is dedicated to data storage by the core 1 and cannot be accessed by the core 2 and the core 3. In response to an access request for the RAM 20 from the core 1, the address converting unit 11 converts a virtual address into a physical address in the core 1 memory 21. In the same way, the core 2 memory 22 of the RAM 20 is a storage area that is dedicated to data storage by the core 2 and cannot be accessed by the core 3 and the core 1. In response to an access request for the RAM 20 from the core 2, the address converting unit 11 converts a virtual address into a physical address in the core 2 memory 22. The core 3 memory 23 of the RAM 20 is a storage area that is dedicated to data storage by the core 3 and cannot be accessed by the core 1 and the core 2. In response to an access request for the RAM 20 from the core 3, the address converting unit 11 converts a virtual address into a physical address in the core 3 memory 23.

The shared memory 30 is a storage area that can be accessed by the cores 1 to 3. In the vehicle-mounted information processing apparatus 10, data is exchanged between the cores 1 to 3, which is to say, communication is realized, by the cores 1 to 3 writing data into and reading data from the shared memory 30 of the RAM 20. Also, in the present embodiment, the cores 1 to 3 add a checksum or the like to the data stored in the shared memory 30 of the RAM 20 as information for use during error detection. When data has been read from the shared memory 30 of the RAM 20, the cores 1 to 3 perform error detection based on the checksum attached to the data. Note that the error detection information added to the data stored in the shared memory 30 is not limited to a checksum, and as other examples may be a parity code or a cyclic code. The addition of error detection information to data and/or error detection processing based on this information may be performed by the address converting unit 11 instead of the cores 1 to 3.

Note that although it is possible for the plurality of cores 1 to 3 to access the shared memory 30, there is a restriction in that the plurality of cores 1 to 3 are not capable of simultaneously accessing at least the same address. To realize this, the address converting unit 11 performs exclusion processing (such as exclusive control or mutual exclusion) to prohibit simultaneous access to the shared memory by the plurality of cores 1 to 3. This exclusion processing is performed using existing techniques, such as semaphores or monitors.

In the present embodiment, the shared memory 30 of the RAM 20 is divided into N areas referred to as the first shared area to the $N^{th}$ shared area. As one example, when the vehicle-mounted information processing apparatus 10 is operated for the first time following manufacture, the exchanging of data between the cores 1 to 3 is performed using the first shared area of the shared memory 30 of the RAM 20, and the shared areas from the second shared area to the $N^{th}$ shared area are not used. When a request to write or read data from the cores 1 to 3 to the shared memory 30 has been provided, the address converting unit 11 converts the virtual address specified by the cores 1 to 3 into a physical address in the first shared area 30 of the shared memory 30. The vehicle-mounted information processing apparatus 10 continuously uses the first shared area to exchange data between the cores 1 to 3 until an abnormality or the like occurs during an exchange of data using the first shared area.

When an abnormality or the like has been detected during exchanging of data using the first shared area, the vehicle-mounted information processing apparatus 10 according to the present embodiment changes the shared area used for exchanging data between the cores 1 to 3 from the first shared area to the second shared area. When a request to write or read data in the shared memory 30 has been provided from the cores 1 to 3, the address converting unit 11 converts the virtual address specified by the cores 1 to 3 to a physical address in the second shared area of the shared memory 30. The vehicle-mounted information processing apparatus 10 continuously uses the second shared area to exchange data between the cores 1 to 3 until an abnormality or the like occurs during an exchange of data using the second shared area.

In this way, the vehicle-mounted information processing apparatus 10 uses one out of the first to $N^{th}$ shared areas produced by dividing the storage area of the shared memory 30 into a plurality of areas to exchange data between the cores 1 to 3 and continues to use the same storage area until an abnormality or the like occurs for the shared area. After this, whenever an abnormality or the like occurs for the shared area used for exchanging data between the cores 1 to 3, the vehicle-mounted information processing apparatus 10 uses another (i.e., the next) shared area. Note that in the present embodiment, the vehicle-mounted information processing apparatus 10 determines whether an abnormality or the like has occurred for a shared area by determining whether a data error has been detected based on the checksum attached to the data read out from the shared area.

The address converting unit 11 reads out the address conversion table 13 stored in advance in the nonvolatile storage unit 12, stores conversion rules and the like that are set in the address conversion table 13 in its own storage unit, such as registers, and thereafter converts virtual addresses of the cores 1 to 3 into physical addresses in the RAM 20 in accordance with such conversion rules and the like. The address conversion table 13 is created in advance by a designer or the like of the vehicle-mounted information processing apparatus 10, for example, and is written into the nonvolatile storage unit 12 at the manufacturing stage or the like of the vehicle-mounted information processing apparatus 10. When the vehicle-mounted information processing apparatus 10 is activated, for example, the address converting unit 11 reads the address conversion table 13 from the nonvolatile storage unit 12, stores the table in its own storage unit, and starts the processing for address conversion.

As described above, the vehicle-mounted information processing apparatus 10 according to the present embodiment has data exchanged between the cores 1 to 3 using one of the shared areas of the shared memory 30 of the RAM 20 and switches to another shared area when an abnormality or the like has occurred for the shared area in use. When this happens, the vehicle-mounted information processing apparatus 10 needs to change the rules for address conversion performed thereafter by the address converting unit 11. The vehicle-mounted information processing apparatus 10 according to the present embodiment changes the address conversion table 13 stored in the nonvolatile storage unit 12 when an abnormality or the like has occurred for a shared area, thereby changing the address conversion performed by the address converting unit 11. The vehicle-mounted information processing apparatus 10 changes an address conversion table 13, in which conversion rules for converting a virtual address related to access to the shared memory 30 by the cores 1 to 3 to a physical address in the first shared area of the shared memory 30 of the RAM 20 is set, to conversion rules that convert to a physical address in the second shared area. After completing the changes to the address conversion table 13 in the nonvolatile storage unit 12, the vehicle-mounted information processing apparatus 10 restarts via a reset, reboot, or the like. Due to this restart, the address converting unit 11 reads out the changed address conversion table 13 from the nonvolatile storage unit 12 and starts address conversion processing, resulting in a change to the content of address conversion.

Note that although the changes to the address conversion table 13 by the vehicle-mounted information processing apparatus 10 may be performed by directly rewriting the conversion rules set in the address conversion table 13, as another example, it is also possible to store a plurality of address conversion tables 13 in advance in the nonvolatile storage unit 12 and to change the address conversion table 13 by rewriting information, such as a flag, indicating which address conversion table 13 is to be read and used by the address converting unit 11.

The process of changing the address conversion table 13 may be performed by one of the cores 1 to 3 (as one example, the core that detected an abnormality for the shared area), may be performed by the address converting unit 11, or may be performed by a functional unit aside from these. In the vehicle-mounted information processing apparatus 10 according to the present embodiment, an abnormality in the shared area of the shared memory 30 of the RAM 20 is detected by the cores 1 to 3 based on the checksum added to the data read from the shared area. When an abnormality has been detected, the cores 1 to 3 notify the address converting unit 11, and the address converting unit 11 performs a process that changes the address conversion table 13 in the nonvolatile storage unit 12.

Flowchart

Figure 3:
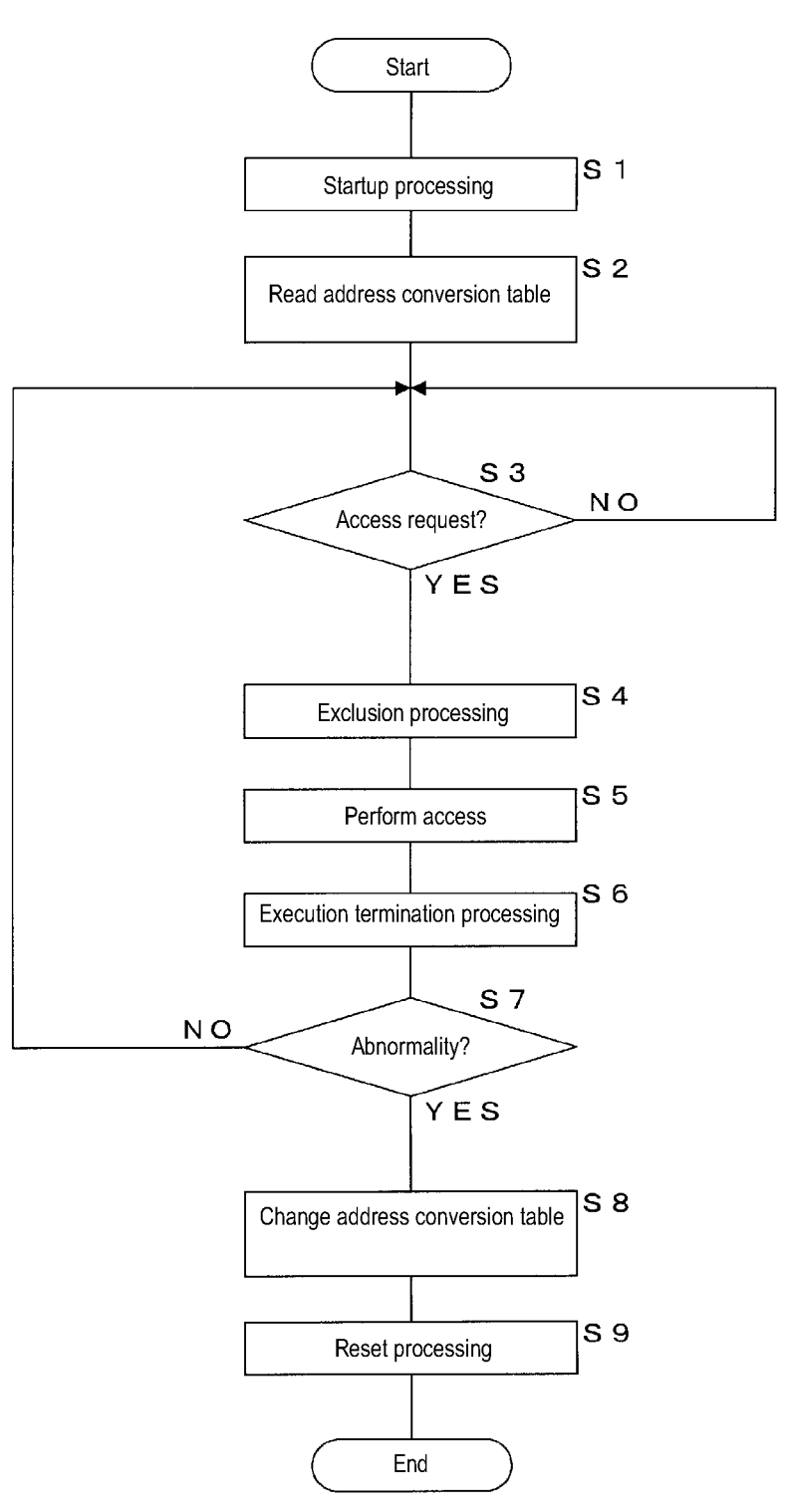
FIG. 3 is a flowchart depicting a procedure of processing performed by an address converting unit 11 of the vehicle-mounted information processing apparatus according to the present embodiment.

FIG. 3 is a flowchart depicting the procedure of processing performed by the address converting unit 11 of the vehicle-mounted information processing apparatus 10 according to the present embodiment. Note that this flowchart depicts the processing procedure when the cores 1 to 3 access the shared memory 30 of the RAM 20, and accesses to the core 1 memory 21, the core 2 memory 22, or the core 3 memory 23 of the RAM 20 are omitted from the drawing. The address converting unit 11 of the vehicle-mounted information processing apparatus 10 according to the present embodiment performs start-up processing, such as initialization of its own registers, in response to the apparatus starting up (step S1). After the start-up processing is complete, the address converting unit 11 reads the address conversion table 13 stored in the nonvolatile storage unit 12 (step S2), and starts address conversion processing based on the settings of the address conversion table 13.

The address converting unit 11 determines whether an access request for writing or reading data to or from the shared memory 30 of the RAM 20 has been provided from one of the cores 1 to 3 (step S3). If no access request has been provided (S3: NO), the address converting unit 11 stands by until an access request is provided. If an access request has been provided (S3: YES), the address converting unit 11 performs exclusion processing to restrict access from other cores 1 to 3 to the shared area of the shared memory 30 of the RAM 20 (step S4). The address converting unit 11 converts the virtual address specified by the core 1 to 3 that issued the access request into a physical address, and accesses the shared area for which the access request was made in order to write or read data (step S5). After this, the address converting unit 11 performs exclusion termination processing to remove the restriction on accesses to the shared areas (step S6).

The address converting unit 11 determines whether the core 1 to 3 that accessed the shared area has given notification of an abnormality (step S7). If notification of an abnormality has not been provided (S7: NO), the processing of the address converting unit 11 returns to step S3. If notification of an abnormality has been given (S7: YES), the address converting unit 11 changes the content of the settings in the address conversion table 13 stored in the nonvolatile storage unit 12 so as to switch from the shared area that is presently being accessed to another shared area (step S8). After the change to the address conversion table 13 is complete, the address converting unit 11 performs a reset processing that resets the vehicle-mounted information processing apparatus 10 (step S9) and ends the process. Note that the vehicle-mounted information processing apparatus 10 is restarted by this reset process, and the processing in step S1 in the illustrated flow chart is commenced.

Figure 4:
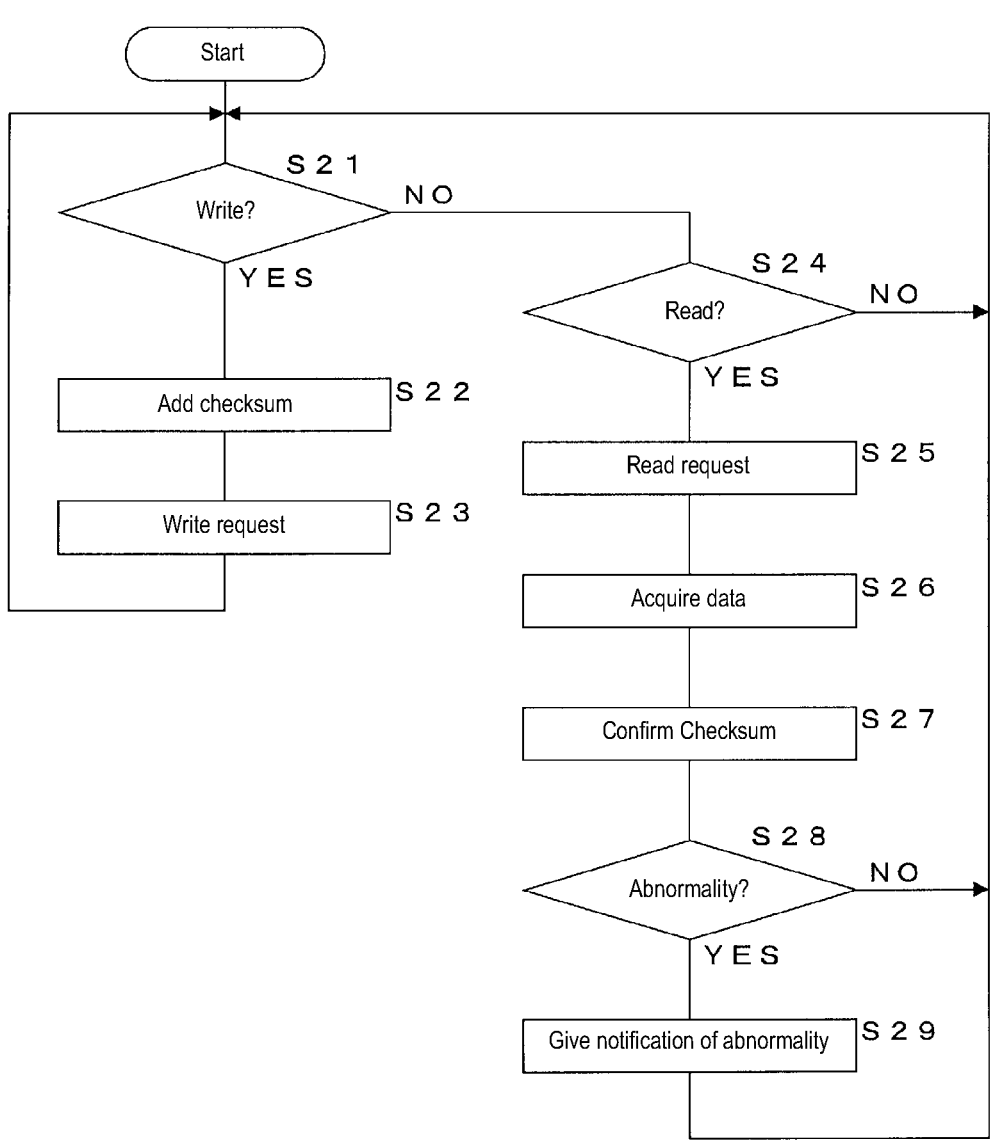
FIG. 4 is a flowchart depicting a procedure of processing performed by the cores of the vehicle-mounted information processing apparatus according to the present embodiment.

FIG. 4 is a flowchart depicting the procedure of processing performed by the cores 1 to 3 of the vehicle-mounted information processing apparatus 10 according to the present embodiment. Note that this flowchart depicts the processing procedure when one of the cores 1 to 3 accesses the shared memory 30 of the RAM 20, and accesses to the core 1 memory 21, the core 2 memory 22, or the core 3 memory 23 of the RAM 20 are omitted from the drawing.

Each core 1 to 3 of the vehicle-mounted information processing apparatus 10 according to the present embodiment determines whether it is necessary to write data into the shared memory 30 of the RAM 20 (step S21). When it is necessary to write data (S21: YES), the core 1 to 3 adds a checksum to the data to be written (step S22). The core 1 to 3 then outputs a write request including the address where the data is to be written and the data with the added checksum to the address converting unit 11 (step S23), and the processing of that core 1 to 3 then returns to step S21.

If it is not necessary to write data (S21: NO), the core 1 to 3 determines whether it is necessary to read data from the shared memory 30 of the RAM 20 (step S24). If there is no need to read data (S24: NO), the processing of that core 1 to 3 returns to step S21. If it is necessary to read data (S24: YES), the core 1 to 3 outputs a read request including the address from which data is to be read to the address converting unit 11 (step S25). The core 1 to 3 then acquires the data read from the shared memory 30 of the RAM 20 in response to the read request (step S26). The core 1 to 3 performs processing that confirms the checksum that was added to the read data (step S27). Based on the result of checking the checksum, the core 1 to 3 determines whether there is an abnormality at the shared memory of the RAM 20 (step S28). If there is no abnormality (S28: NO), the processing of the core 1 to 3 returns to step S21. If there is an abnormality (S28: YES), the core 1 to 3 notifies the address converting unit 11 of the abnormality (step S29), and the processing returns to step S21.

Review

The vehicle-mounted information processing apparatus 10 according to the present embodiment with the configuration described above includes a plurality of cores 1 to 3 that perform processing in parallel, and a shared memory 30 including a plurality of shared areas that can be accessed by the cores 1 to 3. The plurality of cores 1 to 3 exchange information via at least one shared area out of the plurality of shared areas. When an abnormality has been detected in the at least one shared area used for exchanging information, the plurality of cores 1 to 3 exchange information via another shared area. In this manner, even when an abnormality has occurred for at least one shared area, it is likely that the plurality of cores 1 to 3 will be able to continue exchanging information via another shared area.

In addition, in the vehicle-mounted information processing apparatus 10 according to the present embodiment, the address converting unit 11 is provided between the plurality of cores 1 to 3 and the RAM 20 including the plurality of shared areas, with conversion between virtual addresses used by the cores 1 to 3 and physical addresses in the RAM 20 being performed by the address converting unit 11. When an abnormality has been detected for at least one shared area being used to exchange information by the plurality of cores 1 to 3, the address converting unit 11 changes the correspondence between the virtual addresses and the physical addresses and thereby switches the shared area used by the plurality of cores 1 to 3 to exchange information. By operating in this way, it is possible for the cores 1 to 3 to access information without considering the physical address of the shared area.

In the vehicle-mounted information processing apparatus 10 according to the present embodiment, the address conversion table 13 which stores the correspondence between virtual addresses and physical addresses is stored in the nonvolatile storage unit 12, and the address converting unit 11 reads the address conversion table 13 from the nonvolatile storage unit 12 and performs address conversion. When an abnormality has been detected in at least one shared area being used to exchange information between the plurality of cores 1 to 3, the vehicle-mounted information processing apparatus 10 changes the correspondence in the address conversion table 13 so as to change the address conversion performed by the address converting unit 11. In this manner, it is possible to easily change the address conversion performed by the address converting unit 11.

Also in the vehicle-mounted information processing apparatus 10 according to the present embodiment, when the vehicle-mounted information processing apparatus 10 starts up, the address converting unit 11 acquires the address conversion table 13 stored in the nonvolatile storage unit 12 and performs address conversion in accordance with the content of the acquired address conversion table 13. When the vehicle-mounted information processing apparatus has detected an abnormality in at least one shared area being used by the plurality of cores 1 to 3 to exchange information, the content of the address conversion table 13 in the nonvolatile storage unit 12 is changed and then the vehicle-mounted information processing apparatus 10 is restarted. With this configuration, by restarting the vehicle-mounted information processing apparatus 10, it is possible to easily reflect such changes in the address conversion performed by the address converting unit 11.

Also, in the vehicle-mounted information processing apparatus 10 according to the present embodiment, a plurality of areas provided in the shared memory 30 of a single RAM 20 are used as a plurality of shared areas used by the cores 1 to 3 to exchange information. With this configuration, it is possible to realize a plurality of shared areas used by the cores 1 to 3 to exchange information at low cost.

Note that although the address conversion table 13 of the address converting unit 11 is updated in the present embodiment by restarting the vehicle-mounted information processing apparatus 10, the present disclosure is not limited to this and the address conversion table 13 of the address converting unit 11 may be updated by a method aside from restarting. As one example, the address conversion table 13 of the nonvolatile storage unit 12 may be changed when an abnormality has been detected, and after this changing is complete, the address converting unit 11 may acquire the address conversion table 13 from the nonvolatile storage unit 12 without restarting and thereafter use this address conversion table 13 in the address conversion processing.

Although the presence of an abnormality for a shared area is determined when data is read from the shared area in the present embodiment, the timing is not limited to this and the determination of whether there is an abnormality may be performed when writing data into a shared area. The process of changing the address conversion table 13 and restarting the vehicle-mounted information processing apparatus 10 when an abnormality has been detected for a shared area does not need to be performed by the address converting unit 11 and may be performed by any of the cores 1 to 3.

Second Embodiment

The vehicle-mounted information processing apparatus 10 according to the second embodiment writes the same data into a plurality of shared areas of the shared memory 30 in the RAM 20. When a data write request for the shared memory 30 has been provided from the cores 1 to 3, the address converting unit 11 of the vehicle-mounted information processing apparatus 10 according to the second embodiment writes the same data into the first shared area and the second shared area, for example, of the shared memory 30. After this, when a read request for the data has been provided from the cores 1 to 3, the address converting unit 11 reads the data written in the first shared area and provides the data to the core 1 to 3 that provided the request.

When it has been determined, based on the checksum attached to the read data, that an abnormality has occurred for the first shared area, the vehicle-mounted information processing apparatus 10 changes the address conversion table 13 of the address converting unit 11 to switch the shared area for writing and reading data from the first shared area to the second shared area. After this, the address converting unit 11 of the vehicle-mounted information processing apparatus writes the same data in the second shared area and the third shared area in response to a write request from the cores 1 to 3. Also, in response to a read request from the cores 1 to 3, the address converting unit 11 reads the data written in the second shared area and provides the data to the cores 1 to 3.

That is, the vehicle-mounted information processing apparatus 10 according to the second embodiment writes the same data into the $i^{th}$ shared area and the $i+1^{th}$ shared area (where i=1, 2, . . . , N−1) out of the plurality of shared areas in the RAM 20. This writing of the same data into a plurality of shared areas may be performed in parallel or sequentially. When reading data, the vehicle-mounted information processing apparatus 10 reads the data stored in the $i^{th}$ shared area. However, the vehicle-mounted information processing apparatus 10 may instead read the data in the $i+1^{th}$ shared area. The vehicle-mounted information processing apparatus 10 may read data from the two shared areas, confirm that the read data matches, and then provide the data to the core 1 to 3 that issued the request. In this case, when the data read from the two shared areas does not match, the vehicle-mounted information processing apparatus 10 may determine that an abnormality has occurred in the shared areas.

When the RAM 20 is configured using a volatile memory element such as an SRAM or a DRAM, it is preferable for the vehicle-mounted information processing apparatus 10 according to the second embodiment to detect an abnormality in the shared area and change the address conversion table 13 in the nonvolatile storage unit 12 and for the address converting unit 11 to acquire the address conversion table 13 from the nonvolatile storage unit 12 and change the correspondence between the virtual addresses and the physical addresses without the apparatus being restarted. Alternatively, it is preferable to use a configuration where the data stored in the RAM 20 is not initialized when the apparatus is restarted. With this configuration, it is likely that the cores 1 to 3 will be able to continue processing using the data written in the $i+1^{th}$ shared area. Note that when the RAM 20 is constructed using a nonvolatile memory element, the vehicle-mounted information processing apparatus 10 may restart or may not restart.

Figure 5:
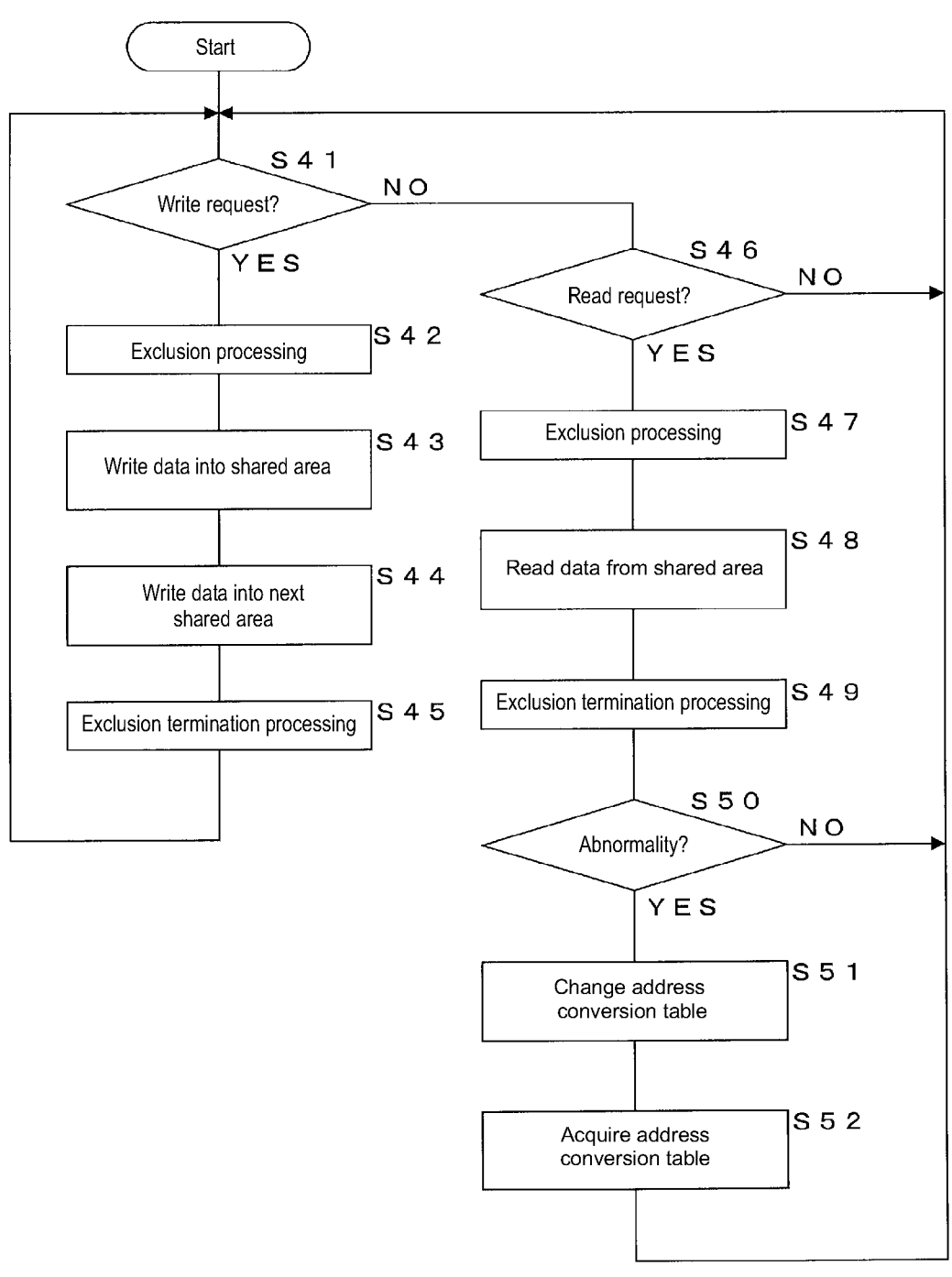
FIG. 5 is a flowchart depicting a procedure of processing performed by an address converting unit 11 of a vehicle-mounted information processing apparatus according to a second embodiment.

FIG. 5 is a flowchart depicting the procedure of processing performed by the address converting unit 11 of the vehicle-mounted information processing apparatus 10 according to the second embodiment. Note that this flowchart depicts the processing procedure when the cores 1 to 3 access the shared memory 30 of the RAM 20, and accesses to the core 1 memory 21, the core 2 memory 22, or the core 3 memory 23 of the RAM 20 are omitted from the drawing.

The address converting unit 11 of the vehicle-mounted information processing apparatus 10 according to the second embodiment determines whether a request to write data into the shared memory 30 of the RAM 20 has been provided from the cores 1 to 3 (step S41). If a write request has been provided (S41: YES), the address converting unit 11 performs exclusion processing to restrict access from other cores 1 to 3 to the shared areas of the shared memory 30 of the RAM 20 (step S42). The address converting unit 11 converts the virtual address specified by the core 1 to 3 that issued the write request into a physical address, and writes the data into the shared area for which the write request was made (step S43). The address converting unit 11 additionally writes the same data in a next shared area that follows the shared area in which the data was written in step S43 (step S44). After this, the address converting unit 11 performs exclusion termination processing to remove the restriction on accesses to the shared areas (step S45), and the processing returns to step S41.

If a write request has not been provided from the cores 1 to 3 (S41: NO), the address converting unit 11 determines whether a data read request for the shared memory 30 of the RAM 20 has been provided from the cores 1 to 3 (step S46). If no read request has been provided (S46: NO), the processing of the address converting unit 11 returns to step S41. If a read request has been provided (S46: YES), the address converting unit 11 performs exclusion processing to restrict access from other cores 1 to 3 to the shared areas of the shared memory 30 of the RAM 20 (step S47). The address converting unit 11 converts the virtual address specified by the core 1 to 3 that issued the read request into a physical address, and reads data from the shared area for which the read request was made (step S48). After this, the address converting unit 11 performs exclusion termination processing to remove the restriction on accesses to the shared areas (step S49).

The address converting unit 11 determines whether the core 1 to 3 that read data from the shared area has given notification that there is an abnormality (step S50). If notification of the presence of an abnormality has not been provided (S50:NO), the processing of the address converting unit 11 returns to step S41. If notification of the presence of an abnormality has been given (S50: YES), the address converting unit 11 changes the settings in the address conversion table 13 stored in the nonvolatile storage unit 12 so as to switch from the present shared area being accessed to another shared area (step S51). After this, the address converting unit 11 acquires the address conversion table 13 from the nonvolatile storage unit 12 (step S52), starts address conversion that reflects the changed settings of the address conversion table 13, and the processing returns to step S41.

The vehicle-mounted information processing apparatus 10 according to the second embodiment with the configuration described above writes the same data into each of a plurality of shared areas in response to a data write requests from a core 1 to 3. With this configuration, it is possible to back up data in a plurality of shared areas. Even when the shared area used by a plurality of cores 1 to 3 to exchange data has changed in response to the detection of an abnormality, since the same data has been stored in the shared area after the change, it is easy for the cores 1 to 3 to continue processing.

Note that although the vehicle-mounted information processing apparatus 10 writes the same data into two shared areas out of a plurality of shared areas in the second embodiment, this is not a limitation, and the same data may be written into three or more shared areas, or the same data may be written into all shared areas.

Also, since the other configurations of the vehicle-mounted information processing apparatus according to the second embodiment are the same as the configurations of the vehicle-mounted information processing apparatus according to the first embodiment, the same parts have been assigned the same reference numerals and detailed description thereof is omitted.

Third Embodiment

Figure 6:
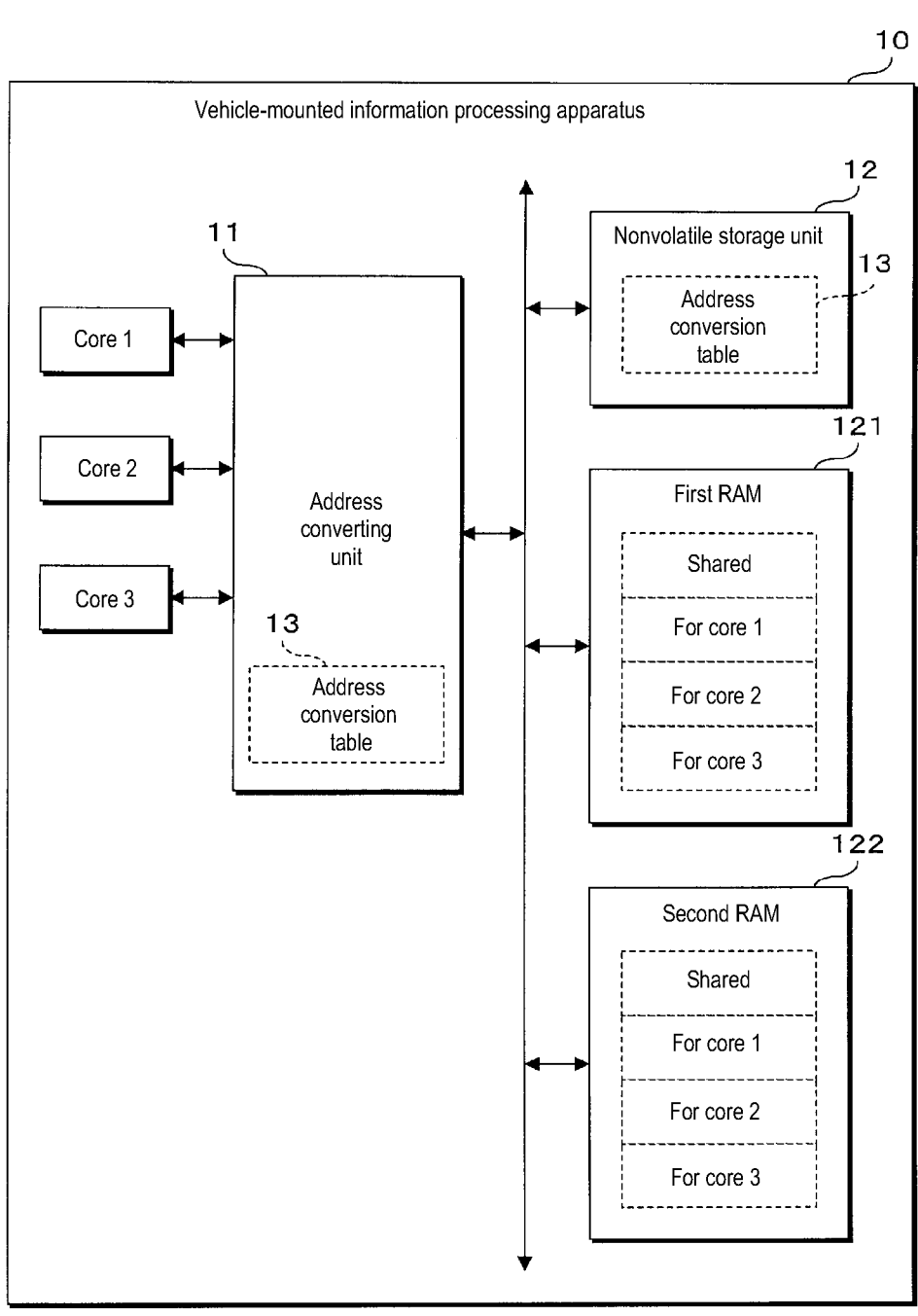
FIG. 6 is a block diagram depicting the configuration of a vehicle-mounted information processing apparatus according to a third embodiment.

FIG. 6 is a block diagram depicting the configuration of a vehicle-mounted information processing apparatus 10 according to the third embodiment. The vehicle-mounted information processing apparatus 10 according to the third embodiment is equipped with a plurality of RAMs that can be accessed by the cores 1 to 3. In the illustrated example, the vehicle-mounted information processing apparatus 10 is equipped with two RAMs, a first RAM 121 and a second RAM 122. Although it is preferable for the first RAM 121 and the second RAM 122 to have the same capacity, this is not a limitation and the capacities may differ.

Figure 7:
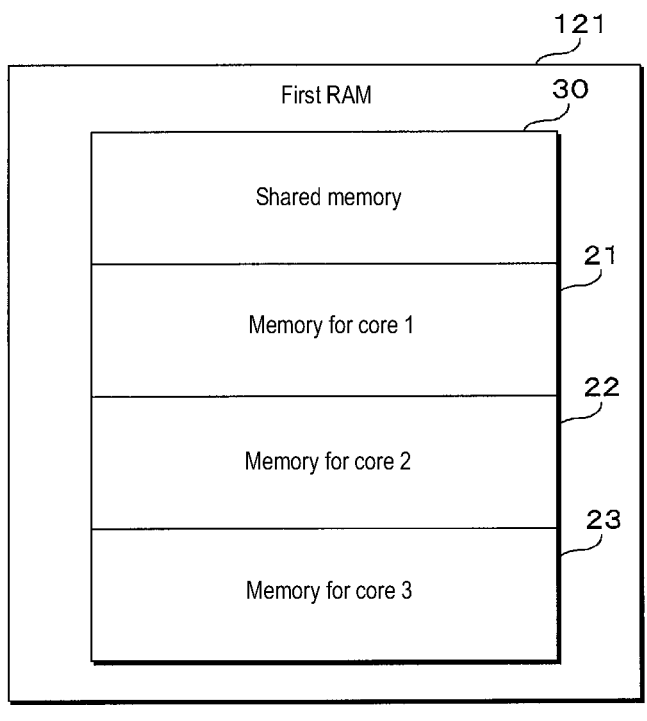
FIG. 7 is a schematic diagram useful in explaining storage areas of a first RAM and a second RAM of the vehicle-mounted information processing apparatus according to the third embodiment.
Figure 7:
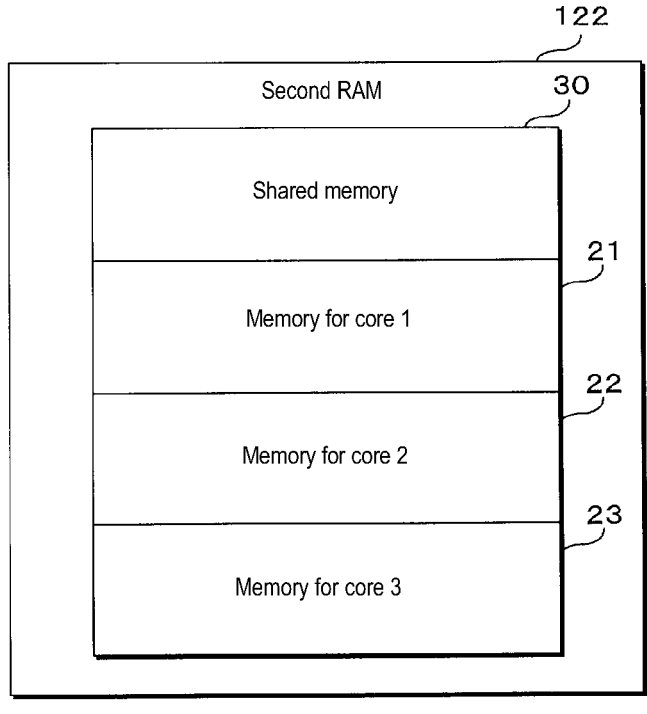

FIG. 7 is a schematic diagram useful in explaining the storage areas of the first RAM 121 and the second RAM 122 of the vehicle-mounted information processing apparatus 10 according to the third embodiment. The storage area of the first RAM 121 of the vehicle-mounted information processing apparatus 10 according to the third embodiment is divided into and used as three main storage areas, the shared memory 30, the core 1 memory 21, the core 2 memory 22, and the core 3 memory 23. In the same way, the storage area of the second RAM 122 is divided into and used as four main storage areas, the shared memory 30, the core 1 memory 21, the core 2 memory 22, and the core 3 memory 23. The core 1 memories 21 in the first RAM 121 and the second RAM 122 are storage areas dedicated to data stored by the core 1 and cannot be accessed by the cores 2 and 3. In the same way, the core 2 memories 22 are storage areas dedicated to data stored by the core 2 and cannot be accessed by the cores 3 and 1. The core 3 memories 23 are storage areas dedicated to data stored by the core 3 and cannot be accessed by the cores 1 and 2.

The shared memories 30 of the first RAM 121 and the second RAM 122 are storage areas that can be accessed by the cores 1 to 3. The shared memories 30 according to the third embodiment are not used by being divided into a plurality of shared areas like the shared memory depicted in FIG. 2, and instead each entire shared memory 30 is used as a single shared area. As one example, when the vehicle-mounted information processing apparatus 10 is operated for the first time following manufacture, reads of data and writes of data by the cores 1 to 3 and the exchanging of data between the cores 1 to 3 are performed using the first RAM 121 and the second RAM 122 is not used. When a data write or read request has been provided from a core 1 to 3, the address converting unit 11 converts a virtual address specified by the core 1 to 3 into a physical address in the first RAM 121. The vehicle-mounted information processing apparatus 10 continuously uses the first RAM 121 for data writes and reads by the cores 1 to 3 until an abnormality or the like occurs for a data write or read that uses the first RAM 121.

When an abnormality or the like has been detected during data writes and reads using the first RAM 121, the vehicle-mounted information processing apparatus 10 according to the third embodiment changes the RAM to be used for data writes and reads by the cores 1 to 3 from the first RAM 121 to the second RAM 122. When a data write or read request has been provided from the cores 1 to 3, the address converting unit 11 converts the virtual address specified by the cores 1 to 3 into a physical address in the second RAM 122.

The vehicle-mounted information processing apparatus 10 according to the third embodiment has data exchanged between the cores 1 to 3 using the shared memory 30 of the first RAM 121. When an abnormality or the like has occurred for the shared memory 30 of the first RAM 121, the vehicle-mounted information processing apparatus 10 switches to the second RAM 122. When this happens, the vehicle-mounted information processing apparatus 10 changes the correspondence used for address conversion by the address converting unit 11 by changing the address conversion table 13 stored in the nonvolatile storage unit 12. As one example, for an address conversion table 13 in which conversion rules for converting virtual addresses relating to accesses to the shared memory 30 by the cores 1 to 3 into physical addresses in the shared memory 30 of the first RAM 121 have been set, the vehicle-mounted information processing apparatus 10 changes the conversion rules that convert to physical addresses in the shared memory 30 of the second RAM 122.

The vehicle-mounted information processing apparatus 10 according to the third embodiment with the configuration described above is equipped with a plurality of memory elements as the first RAM 121 and the second RAM 122, the cores 1 to 3 exchange data via the first RAM 121, and when an abnormality has occurred for the first RAM 121, a switch is performed from the first RAM 121 to the second RAM 122 so that the cores 1 to 3 exchange data via the second RAM 122. In this manner, even when an abnormality has occurred for the first RAM 121, it is likely that the plurality of cores 1 to 3 will be able to continue exchanging data via the second RAM 121.

Note that although a configuration where the vehicle-mounted information processing apparatus 10 is equipped with two RAMS, the first RAM 121 and the second RAM 122, has been described in the third embodiment, the configuration is not limited to this, and the vehicle-mounted information processing apparatus 10 may be equipped with three or more RAMS and the RAM to be used may be switched in order in response to detection of an abnormality.

The vehicle-mounted information processing apparatus 10 according to the third embodiment may also perform a switch from the first RAM 121 to the second RAM 122 not only when an abnormality has been detected in the shared memory 30 of the first RAM 121 but also when an abnormality has been detected in the core 1 memory 21, the core 2 memory 22, or the core 3 memory 23. In this case, information for error detection, such as a checksum, is added to the data stored in the core 1 memory 21, the core 2 memory 22, and the core 3 memory 23. Also, although the second RAM 122 of the vehicle-mounted information processing apparatus 10 is configured so as to be provided with the core 1 memory 21, the core 2 memory 22, and the core 3 memory 23, the configuration is not limited to this and the second RAM 122 may be provided with only a shared memory. In this case, the capacity of the second RAM 122 may be smaller than the capacity of the first RAM 121.

In the vehicle-mounted information processing apparatus 10 according to the third embodiment, the shared memories 30 of the first RAM 121 and the second RAM 122 may be provided with the first to $N^{th}$ shared areas depicted in FIG. 2. In this case, the vehicle-mounted information processing apparatus 10 switches the area in use in order from the first shared area to the $N^{th}$ shared area of the shared memory 30 of the first RAM 121 and switches, when an abnormality has been detected for the $N^{th}$ shared area of the shared memory 30 of the first RAM 121, to the first shared area of the shared memory 30 of the second RAM 122. The vehicle-mounted information processing apparatus 10 according to the third embodiment may also write the same data in both the first RAM 121 and the second RAM 122 in the same way as the vehicle-mounted information processing apparatus 10 according to the second embodiment.

Since the other configurations of the vehicle-mounted information processing apparatus according to the third embodiment are the same as in the vehicle-mounted information processing apparatus according to the first embodiment, the same parts have been assigned the same reference numerals and detailed description thereof is omitted.

Fourth Embodiment

The vehicle-mounted information processing apparatuses according to the first to third embodiments are configured to eliminate the adverse effects of abnormalities by switching between the first shared area to the $N^{th}$ shared area of the shared memory 30 when an abnormality has been detected. On the other hand, the disclosure according to the fourth embodiment is configured to prevent malicious infiltrations, attacks, and the like from the outside from identifying which of the first to $N^{th}$ shared areas of the shared memory 30 is being used and to prevent unauthorized rewriting of data or the like in the shared memory 30.

Figure 8:
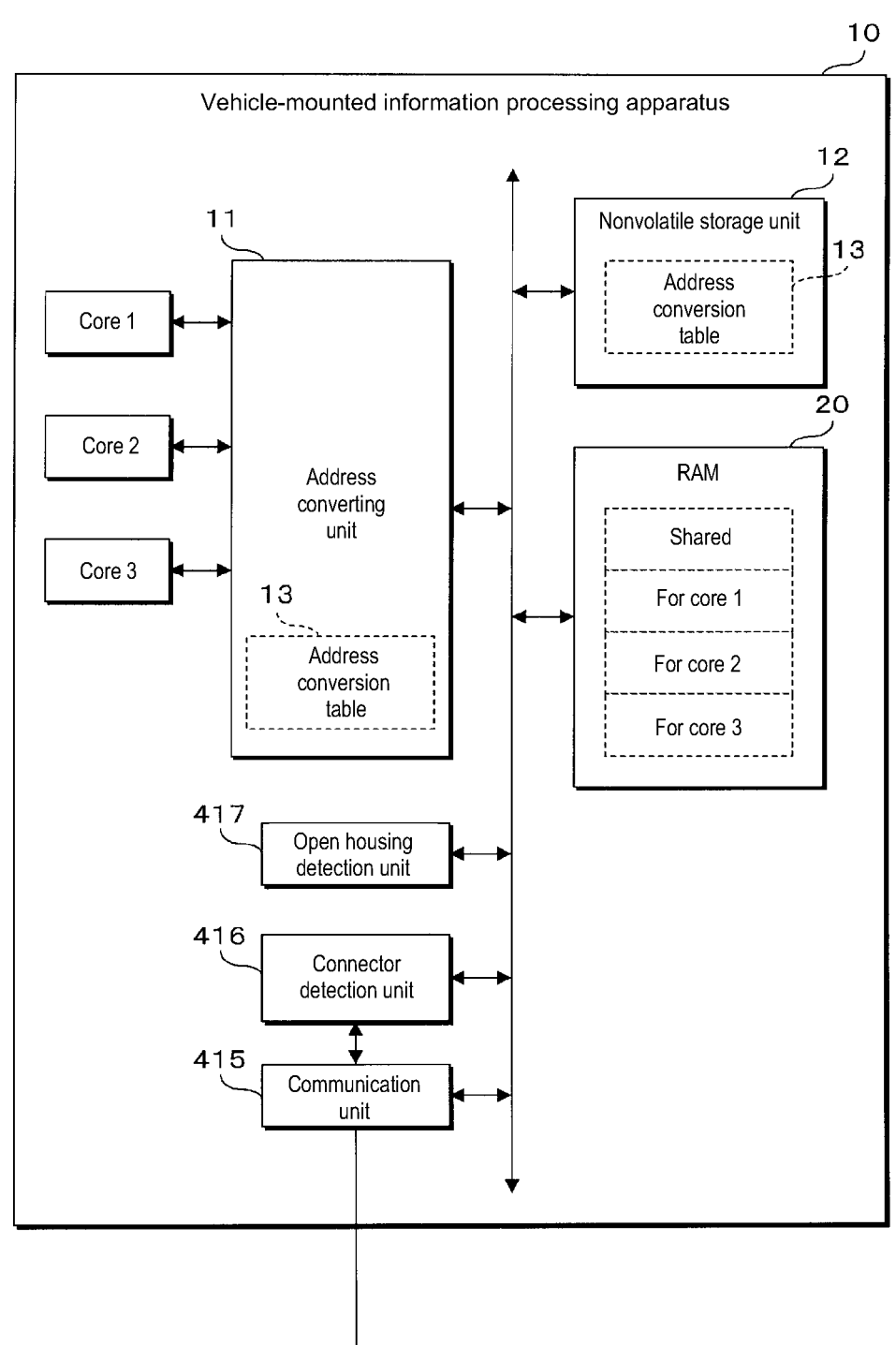
FIG. 8 is a block diagram depicting the configuration of a vehicle-mounted information processing apparatus according to a fourth embodiment.

FIG. 8 is a block diagram depicting the configuration of a vehicle-mounted information processing apparatus according to the fourth embodiment. The vehicle-mounted information processing apparatus according to the fourth embodiment includes the cores 1 to 3, the address converting unit 11, the nonvolatile storage unit 12, the RAM 20, a communication unit 415, a connector detection unit 416, an open housing detection unit 417, and the like. Since the cores 1 to 3, the address converting unit 11, the nonvolatile storage unit 12, and the RAM 20 are the same as those provided in the vehicle-mounted information processing apparatus according to the first embodiment depicted in FIG. 1, description thereof is omitted.

The communication unit 415 communicates with other apparatuses via a vehicle-mounted network provided in the vehicle 100. The communication unit 415 communicates based on a communication protocol, for example, CAN (Controller Area Network) or Ethernet (registered trademark). The vehicle-mounted information processing apparatus 10 is connected to a communication line that constructs the vehicle-mounted network, and the communication unit 415 converts transmission data provided from the cores 1 to 3 into an electrical signal and outputs to the communication line. The communication unit 415 samples and acquires the potential of the communication line, converts the electrical signal on the communication line into digital data, and provides the converted data to the cores 1 to 3 as reception data.

The connector detection unit 416 detects a connection state of between a connector, which is provided on a communication line, a power supply line, or the like, and one or a plurality of connectors provided in the vehicle-mounted information processing apparatus. As one example, by detecting the amount of current flowing through its own connector, changes to this current, or the like, the connector detection unit 416 detects whether the connector of a communication line or the like is connected to the connector detection unit 416's own connector. When the connector of a communication line or the like has been connected to this connector or when the connected connector has been disconnected, the connector detection unit 416 gives notification to the cores 1 to 3 and the like.

The open housing detection unit 417 detects that the housing of the vehicle-mounted information processing apparatus 10 has been opened. The vehicle-mounted information processing apparatus 10 is configured with a circuit board, on which circuit elements such as the cores 1 to 3 have been mounted, housed in a housing made of synthetic resin or metal, for example. As one example, the housing is shaped as a rectangular parallelepiped with one surface as a detachable lid. As one example, the open housing detection unit 417 is connected to a switch that is switched on and off in keeping with attachment and detachment of the lid, detects whether the housing has been opened by detecting the on/off state of this switch, and notifies the cores 1 to 3 and the like of the detection result.

In the vehicle-mounted information processing apparatus, data is exchanged between the plurality of cores 1 to 3 by the cores 1 to 3 performing data writes and reads using any one (or a plurality) of the first to $N^{th}$ shared areas included in the shared memory 30 of the RAM 20. The vehicle-mounted information processing apparatus according to the fourth embodiment performs processing that changes which of the first shared area to the $N^{th}$ shared area of the shared memory 30 is used by the cores 1 to 3 at predetermined timing and thereby makes it difficult to identify from outside which of the shared areas is being used by the cores 1 to 3.

In the fourth embodiment, as examples, (1) to (5) below can be used as the predetermined timing at which the vehicle-mounted information processing apparatus performs the process of changing which shared area is used. However, timing that differs from (1) to (5) below may be used as the predetermined timing for performing the process of changing the shared area.

(1) The shared area is changed every time the vehicle-mounted information processing apparatus is started.

(2) The shared area is changed when any kind of attack on the vehicle-mounted information processing apparatus from outside has been detected.

(3) The shared area is repeatedly changed with a predetermined cycle.

(4) The shared area is changed when the housing of the vehicle-mounted information processing apparatus has been opened.

(5) The shared area is changed when the connector connected to the vehicle-mounted information processing apparatus is removed.

When the Apparatus Starts Up

The vehicle-mounted information processing apparatus according to the fourth embodiment starts up by being supplied with electric power from a battery or the like for example when the ignition switch of the vehicle 100 is switched from an off state to an on state. The vehicle-mounted information processing apparatus performs a start-up process including processing such as initialization of the registers inside the cores 1 to 3 and the RAM 20, for example, and then starts processing that changes the shared area in the shared memory 30 of the RAM 20.

As one example, the vehicle-mounted information processing apparatus randomly selects one shared area from the N shared areas composed of the first shared area to the $N^{th}$ shared area. Note that the method of selecting the shared area may be a method aside from selection at random. As examples, the selection of the shared area may be performed by any one of the cores 1 to 3 of the vehicle-mounted information processing apparatus 10, may be performed by the address converting unit 11, or may be performed by a control circuit or the like. The vehicle-mounted information processing apparatus changes the address conversion table 13 in the non-volatile storage unit 12 so that one shared area that has been randomly selected out of the N shared areas becomes a storage area shared by the cores 1 to 3. The address converting unit 11 of the vehicle-mounted information processing apparatus acquires the changed address conversion table 13 from the nonvolatile storage unit 12 and controls access to the RAM 20 by the cores 1 to 3 according to the acquired address conversion table 13.

When an Attack is Detected

The vehicle-mounted information processing apparatus 10 communicates via the vehicle-mounted network with other apparatuses mounted in the vehicle 100 using the communication unit 415. The communication unit 415 of the vehicle-mounted information processing apparatus 10 according to fourth embodiment has a function of detecting an external attack on the vehicle-mounted information processing apparatus 10 via the vehicle-mounted network. As examples, it is possible to detect that the vehicle-mounted information processing apparatus 10 has been attacked when the communication unit 415 has received data to which unregistered identification information (such as a CAN-ID) is attached, when the amount of data transmitted to the vehicle-mounted network in a certain period exceeds a threshold, or when data that should be transmitted with a predetermined cycle has been received at different timing to that cycle. The communication unit 415 that has detected the attack gives notification to the cores 1 to 3 and the like. When the communication unit 415 has detected an attack, the vehicle-mounted information processing apparatus 10 randomly selects one out of the N shared areas and changes to the selected shared area.

Predetermined Cycle

The vehicle-mounted information processing apparatus 10 according to the fourth embodiment changes the shared area used by the cores 1 to 3 at a cycle set in advance. This predetermined cycle for changing the shared area can be set at an appropriate period, such as several minutes to several tens of minutes, or several hours to several days. After changing the shared area, the vehicle-mounted information processing apparatus 10 starts keeping time using its own timer function or the like, randomly selects one out of the N shared areas when the time measured by the timer has reached a time set as the predetermined cycle, and changes to the selected shared area.

Housing Opened

As described above, the vehicle-mounted information processing apparatus 10 according to the fourth embodiment is equipped with the open housing detection unit 417. When the open housing detection unit 417 has detected that the housing of the vehicle-mounted information processing apparatus 10 has been opened (that is, the lid of the housing has been removed), the vehicle-mounted information processing apparatus 10 randomly selects one shared area out of the N shared areas and changes to the selected shared area.

Removal of Connector

The vehicle-mounted information processing apparatus 10 according to the fourth embodiment is equipped with the connector detection unit 416 as described above. When the connector detection unit 416 has detected that the connector of the communication line has been removed from the connector of the vehicle-mounted information processing apparatus 10, the vehicle-mounted information processing apparatus 10 randomly selects one out of the N shared areas and changes to the selected shared area.

Figure 9:
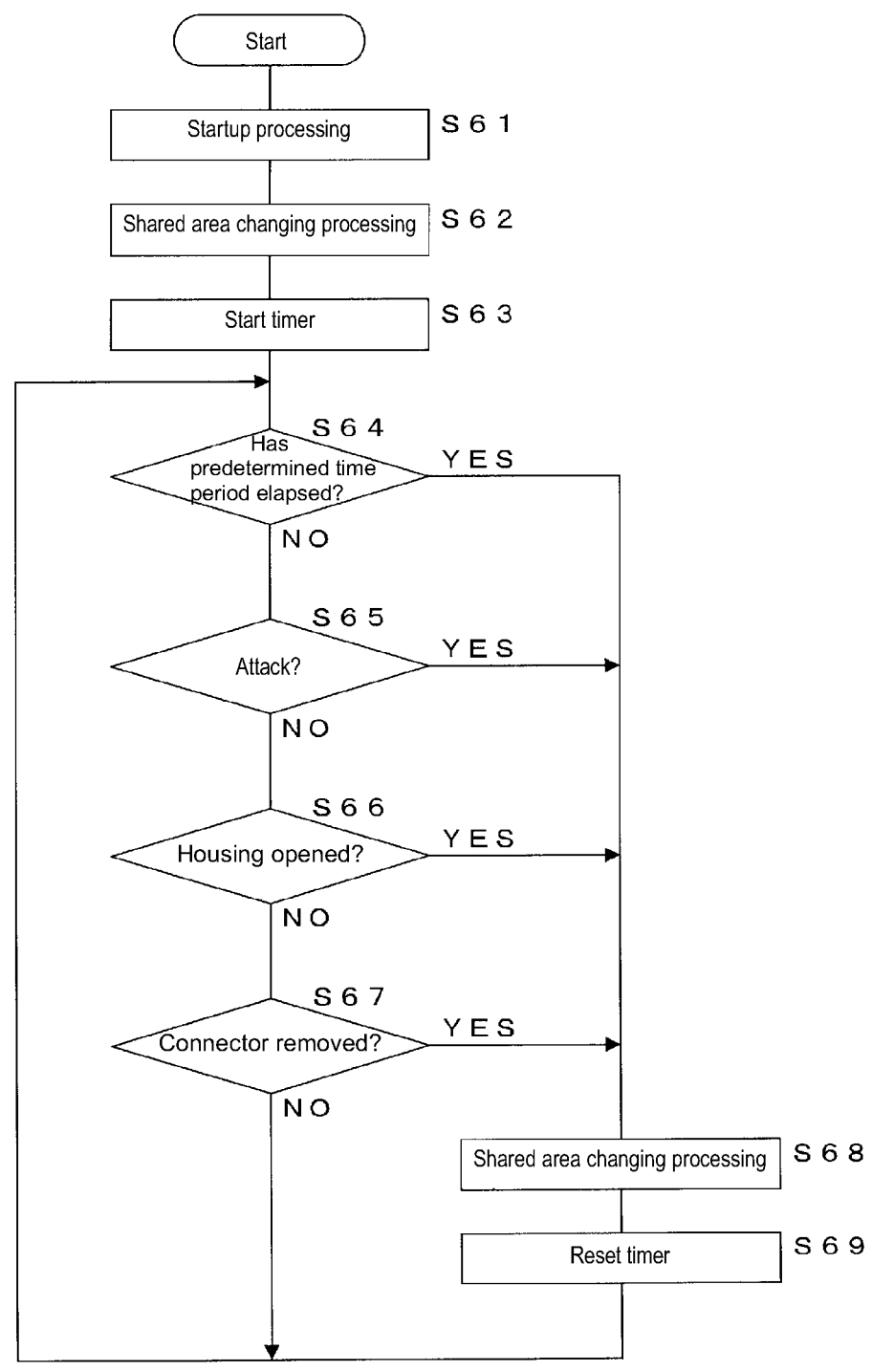
FIG. 9 is a flowchart depicting the procedure of processing performed by the vehicle-mounted information processing apparatus according to the fourth embodiment.

FIG. 9 is a flowchart depicting the procedure of processing performed by the vehicle-mounted information processing apparatus 10 according to the fourth embodiment. Note that the processing depicted in this drawing is performed by one of the cores 1 to 3 of the vehicle-mounted information processing apparatus 10 or the address converting unit 11. However, the vehicle-mounted information processing apparatus 10 may be equipped with another functional unit, circuit, or the like that performs this processing. In the following description, it is assumed that the core 1 performs this processing.

The core 1 of the vehicle-mounted information processing apparatus according to the fourth embodiment performs startup processing, such as initialization of its own registers, when the vehicle-mounted information processing apparatus 10 starts up (step S61). After the startup processing has been completed, the core 1 performs processing that changes the shared area to be used by the cores 1 to 3 to exchange data, out of the plurality of shared areas included in the shared memory 30 of the RAM 20 (step S62). After completion of this shared area changing processing, the core 1 starts keeping time using its own timer (step S63). This timer is used to determine the cycle for executing the shared area changing processing.

The core 1 determines whether a predetermined period has elapsed since execution of the previous shared area changing processing, based on whether the elapsed time measured by the timer has exceeded a preset time (step S64). If the predetermined period has elapsed (S64: YES), the core 1 performs the shared area changing processing (step S68), resets the timer (step S69), and the processing returns to step S64.

If the predetermined period has not elapsed (S64: NO), the core 1 determines whether there has been an attack from the outside based on the presence or absence of notification from the communication unit 415 (step S65). If there has been an attack from outside (S65: YES), the core 1 performs the shared area changing processing (step S68), resets the timer (step S69), and the processing returns to step S64.

If no attack has been received from outside (S65: NO), the core 1 determines whether the housing of the vehicle-mounted information processing apparatus 10 has been opened based on the presence of a notification from the open housing detection unit 417 (step S66). If the housing has been opened (S66: YES), the core 1 performs the shared area changing processing (step S68), resets the timer (step S69), and the processing returns to step S64.

If the housing has not been opened (S66: NO), the core 1 determines, based on the notification from the connector detection unit 416, whether the connector of a communication line that is connected to the connector of the vehicle-mounted information processing apparatus 10 has been removed (step S67). If the connector has been removed (S67: YES), the core 1 performs the shared area changing processing (step S68), resets the timer (step S69), and the processing returns to step S64. If the connector has not been removed (S67: NO), the processing of the core 1 returns to step S64.

Figure 10:
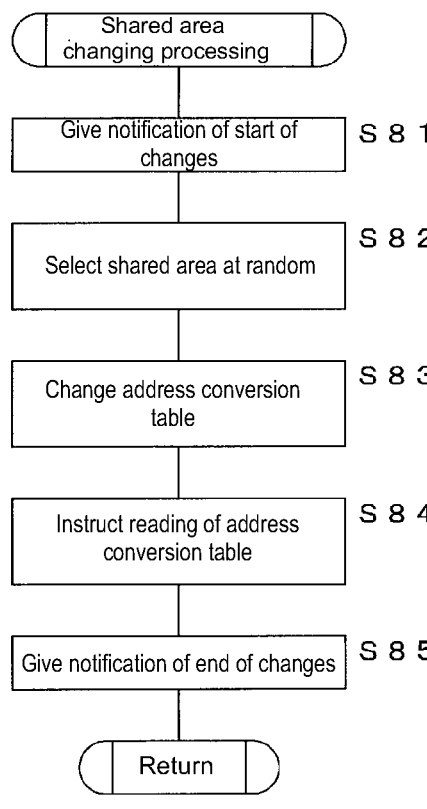
FIG. 10 is a flowchart depicting a procedure of a shared area changing processing performed by the vehicle-mounted information processing apparatus according to the fourth embodiment.

FIG. 10 is a flowchart depicting a procedure of shared area changing processing performed by the vehicle-mounted information processing apparatus 10 according to the fourth embodiment. The shared area changing processing depicted in this drawing is the processing performed in steps S62 and S68 of the flowchart depicted in FIG. 9.

The core 1 of the vehicle-mounted information processing apparatus according to the fourth embodiment notifies the other cores 2 and 3 of the start of the shared area changing processing (step S81). As one example, the other cores 2 and 3 that have received this notification may temporarily stop their own processing and stand by until the shared area changing processing ends.

The core 1 randomly selects one or a plurality of shared areas to be used by the cores 1 to 3 out of the plurality of shared areas (that is, the first shared area to the Nth shared area) of the shared memory 30 in the RAM 20 (step S82). The core 1 changes the address conversion table 13 in the nonvolatile storage unit 12 so that the selected shared area(s) is/are used by the cores 1 to 3 (step S83).

The core 1 instructs the address converting unit 11 to read the address conversion table 13 from the nonvolatile storage unit 12 (step S84). In response to this instruction, the address converting unit 11 reads the changed address conversion table 13 and thereafter performs address conversion according to the read address conversion table 13.

The core 1 notifies the other cores 2 and 3 of the end of the shared area changing processing (step S85), and ends the shared area changing processing. In response to this notification, the other cores 2 and 3 can resume their processing that was suspended until the end of the shared area changing processing.

The vehicle-mounted information processing apparatus 10 according to the fourth embodiment with the configuration described above changes the shared area of the shared memory 30 of the RAM 20 that is used by the plurality of cores 1 to 3 to exchange information at predetermined timing. Since this is likely to result in the vehicle-mounted information processing apparatus 10 having improved security performance, this is likely to contribute to the adoption of a multicore plus shared memory configuration in apparatuses installed in a vehicle.

The predetermined timing for changing the shared area in the vehicle-mounted information processing apparatus 10 according to the fourth embodiment includes at least one of timing at which the vehicle-mounted information processing apparatus 10 starts up, timing at which the communication unit 415 has detected an attack from the outside, timing at which a predetermined period has elapsed, timing at which the open housing detection unit 417 has detected that the housing of the vehicle-mounted information processing apparatus 10 has been opened, and timing at which the connector of a communication line connected to the connector of the vehicle-mounted information processing apparatus 10 is disconnected. By changing the shared area at such timing, it is possible when the vehicle-mounted information processing apparatus 10 has been maliciously infiltrated or attacked from the outside, for example, to make it difficult to identify which shared area is being used by the plurality of cores 1 to 3 and thereby make it difficult to perform tampering and the like of the information in the shared area.

The vehicle-mounted information processing apparatus 10 according to the fourth embodiment randomly selects one or a plurality of shared areas to be used by the cores 1 to 3 out of the plurality of shared areas (that is, the first shared area to the $N^{th}$ shared area) included in the shared memory 30 of the RAM 20. In this manner, the vehicle-mounted information processing apparatus 10 makes it difficult to identify which shared area is being used by the plurality of cores 1 to 3 from the outside.

Note that although five timings, composed of the start-up timing of the apparatus, the timing at which an attack from outside is detected, the timing at which a predetermined period has elapsed, the timing at which the housing is opened, and the timing at which a connector is disconnected have been given as the timing at which the vehicle-mounted information processing apparatus 10 according to the fourth embodiment changes the shared area, such timings are mere examples. The vehicle-mounted information processing apparatus 10 may perform the process of changing the shared area at various timings other than the five timings listed above.

Although the vehicle-mounted information processing apparatus 10 according to the fourth embodiment is configured with a plurality of shared areas provided in one RAM 20, the configuration is not limited to this. In the same way as the vehicle-mounted information processing apparatus 10 according to the third embodiment, the vehicle-mounted information processing apparatus 10 may be configured so as to include a plurality of RAMs and may be configured so that the RAM shared by the cores 1 to 3 is changed.

In addition, since other configurations of the vehicle-mounted information processing apparatus according to the fourth embodiment are the same as those of the vehicle-mounted information processing apparatuses according to the first to third embodiments, parts that are the same have been assigned the same reference numerals and detailed description thereof is omitted.

A vehicle-mounted information processing apparatus is equipped with a computer including a microprocessor, a ROM, a RAM, and the like. A computational processing unit like the microprocessor may read out and execute a computer program, which includes part or all of the steps in the sequence diagrams or flowcharts given in FIGS. 3 to 5, from a storage unit such as the ROM or RAM. Computer programs for this plurality of apparatuses can be installed from an external server apparatus or the like. These computer programs are distributed in a state where the program has been stored on a recording medium such as a CD-ROM, a DVD-ROM, or a semiconductor memory.

All features of the embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

APPENDICES

Appendix 1

A vehicle-mounted information processing apparatus that is mounted in a vehicle, including: a plurality of processing units configured to execute processing in parallel; a plurality of shared storage units that are accessible by the plurality of processing units; and a detection unit configured to detect an abnormality in the shared storage units, wherein the plurality of processing units exchange information via at least one of the shared storage units and exchange information, when the detection unit has detected an abnormality at the at least one shared storage unit, via a different shared storage unit.

Appendix 2

The vehicle-mounted information processing apparatus according to Appendix 1, further including an address converting unit that is provided between the plurality of processing units and the plurality of shared storage units and that is configured to convert between virtual addresses used by the processing units when accessing stored information and physical addresses in the shared storage units, and wherein the address converting unit changes a correspondence between the virtual addresses and the physical addresses when the detection unit has detected an abnormality to switch the shared storage unit where the plurality of processing units exchange information.

Appendix 3

The vehicle-mounted information processing apparatus according to Appendix 2, further including a storage unit storing an address conversion table in which the correspondence between the virtual addresses and the physical addresses is stored, wherein the address converting unit performs address conversion based on the address conversion table stored in the storage unit, and changes the correspondence stored in the address conversion table when the detection unit has detected an abnormality.

Appendix 4

The vehicle-mounted information processing apparatus according to Appendix 3, wherein the address converting unit acquires the address conversion table stored in the storage unit when the apparatus starts up, and when the detection unit has detected an abnormality, the correspondence stored in the address conversion table stored is changed in the storage unit, and the apparatus then restarts.

Appendix 5

The vehicle-mounted information processing apparatus according to any one of Appendix 1 to Appendix 4, wherein in response to a write request for information from the processing units, the same information is stored in each of the plurality of shared storage units.

Appendix 6

The vehicle-mounted information processing apparatus according to any one of Appendix 1 to Appendix 5, wherein the plurality of shared storage units are a plurality of storage areas provided in a single memory element that is accessible by the plurality of processing units.

Appendix 7

The vehicle-mounted information processing apparatus according to any one of Appendix 1 to Appendix 5, wherein the plurality of shared storage units are a plurality of memory elements that are accessible by the plurality of processing units.

Appendix 8

A vehicle-mounted information processing method comprising: exchanging, in a vehicle-mounted information processing apparatus provided with a plurality of processing units for executing processing in parallel and a plurality of shared storage units that are accessible by the plurality of processing units, information between the plurality of processing units via at least one of the shared storage units; detecting an abnormality occurred at any of the shared storage units; and the plurality of processing unit exchanging information between a different shared storage unit when an abnormality at the at least one shared storage unit has been detected.

The invention claimed is:

1. A vehicle-mounted information processing apparatus that is mounted in a vehicle, the vehicle-mounted information processing apparatus comprising:
   a plurality of processing units configured to execute processing in parallel;
   a plurality of shared storage units that are accessible by the plurality of processing units;
   a detection unit configured to detect an abnormality occurred at any of the plurality of shared storage units;
   a first storage unit storing an address conversion table in which a correspondence between virtual addresses and physical addresses is stored;
   an address converting unit that is provided between the plurality of processing units and the plurality of shared storage units and is configured to convert between virtual addresses used by the processing units when accessing stored information and physical addresses in the plurality of shared storage units; and
   wherein the plurality of processing units exchange information via at least one shared storage unit of the plurality of shared storage units, and change the at least one shared storage unit used to exchange information at predetermined timing, wherein the predetermined timing is timing at which the detection unit detects an abnormality occurred at the at least one shared storage unit including a timing at which an attack from outside has been detected, and wherein the address converting unit changes the correspondence between the virtual addresses and the physical addresses stored in the first storage unit, wherein the changes are made at the predetermined timing to switch the at least one shared storage unit where the plurality of processing units exchange information to a different shared storage unit of the plurality of shared storage unit.

2. The vehicle-mounted information processing apparatus according to claim 1, wherein the predetermined timing further includes at least one of timing at which the apparatus starts up, timing at which a predetermined period has elapsed, timing at which an apparatus housing has been opened, and timing at which a connector connected to the apparatus has been disconnected.

3. The vehicle-mounted information processing apparatus according to claim 2, wherein the plurality of processing units change the at least one shared storage unit used to exchange information to a shared storage unit selected at random out of the plurality of shared storage units.

4. The vehicle-mounted information processing apparatus according to claim 1 further includes,
   wherein the address converting unit acquires the address conversion table stored in the first storage unit when the apparatus starts up, and
   at the predetermined timing, the correspondence stored in the address conversion table stored in the first storage unit is changed, and the apparatus then restarts.

5. The vehicle-mounted information processing apparatus according to claim 1, wherein in response to a write request for information from the plurality of processing units, the same information is stored in each of the plurality of shared storage units.

6. The vehicle-mounted information processing apparatus according to claim 1, wherein the plurality of shared storage units are a plurality of storage areas provided in a single memory element that is accessible by the plurality of processing units.

7. The vehicle-mounted information processing apparatus according to claim 1, wherein the plurality of shared storage units are a plurality of memory elements that are accessible by the plurality of processing units.

8. A vehicle-mounted information processing method comprising:
   providing, in a vehicle-mounted information processing apparatus, a plurality of processing units to execute processing in parallel, and a plurality of shared storage units that are accessible by the plurality of processing units;
   providing, in the vehicle-mounted information processing apparatus, a first storage unit that stores an address conversion table in which a correspondence between virtual addresses and physical addresses is stored;
   providing, in the vehicle-mounted information processing apparatus, an address converting unit between the plurality of processing units and the plurality of shared storage units to convert between virtual addresses used by the processing units when accessing stored information and physical addresses in the plurality of shared storage units;
   exchanging information between the plurality of processing units via at least one shared storage unit of the plurality of shared storage units;
   detecting an abnormality occurred at the at least one shared storage unit of the plurality of shared storage units including a predetermined timing at which an attack from outside has been detected;
   changing the at least one shared storage unit used to exchange information in response to detecting the abnormality occurred at the at least one shared storage unit including the attack from outside has been detected; and
   changing, by the address converting unit, the correspondence between the virtual addresses and the physical addresses stored in the first storage unit, wherein the changes are made at the predetermined timing to switch the at least one shared storage unit where the plurality of processing units exchange information to a different shared storage unit of the plurality of shared storage unit.

\* \* \* \* \*